Dec. 7, 1926.   1,609,790
O. H. BOCHMAN
BELT GUIDING AND HOLDING MEANS
Filed May 14, 1926
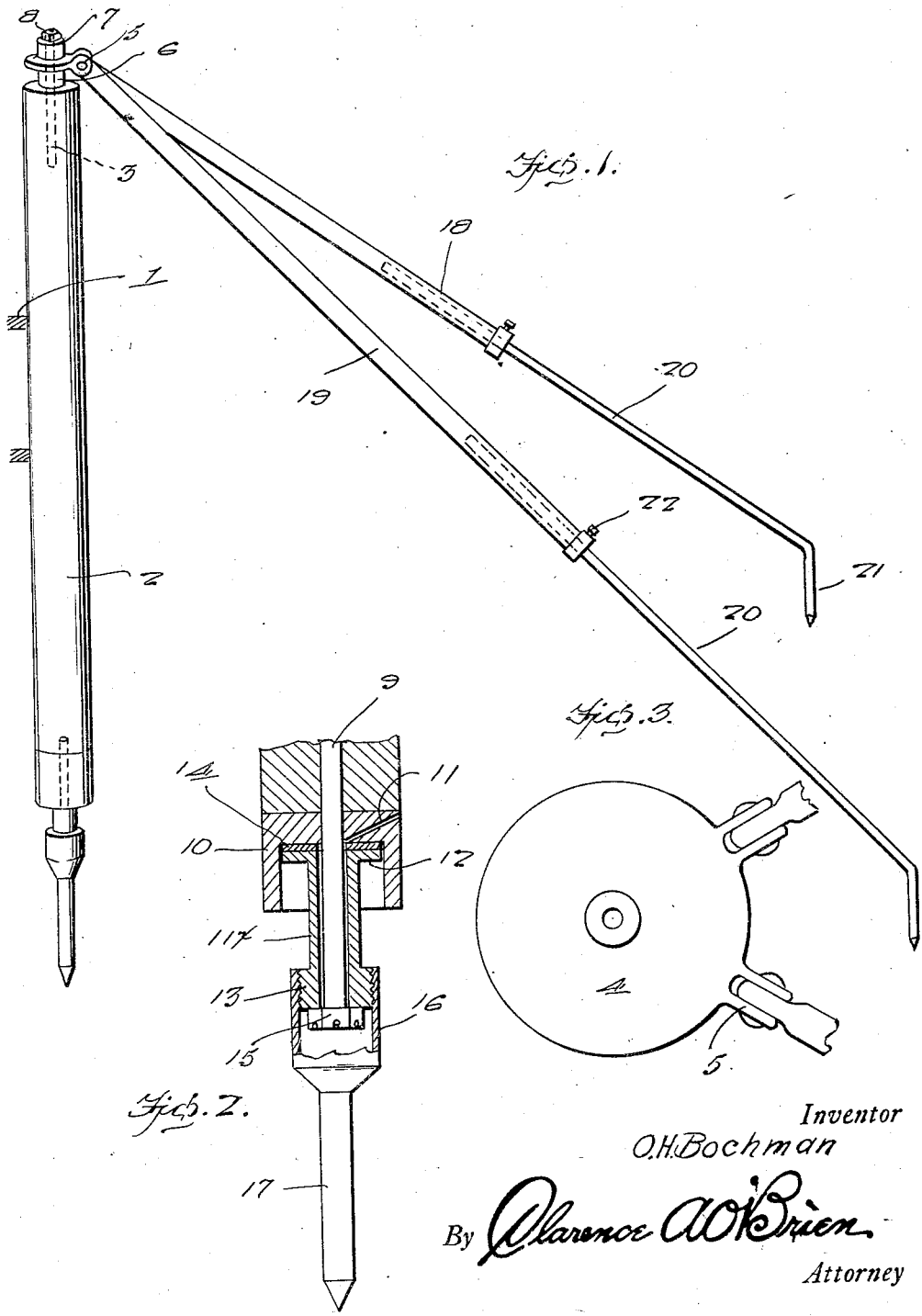
Inventor
O. H. Bochman
By Clarence A. O'Brien
Attorney Patented Dec. 7, 1926.

1,609,790

UNITED STATES PATENT OFFICE.

OTTO H. BOCHMAN, OF TYNDALL, SOUTH DAKOTA.

BELT GUIDING AND HOLDING MEANS.

Application filed May 14, 1926. Serial No. 109,110.

The object of my present invention is the provision of guiding and holding means designed more especially for use in conjunction with long threshing machine belts when the machinery is set laterally or sidewise to the wind.

My said guiding and holding means is designed in use to prevent the belt from flapping in the wind and tending to run off the pulley wheel, an occurrence which frequently takes place when the belt is arranged sidewise to the wind and particularly when the belt is loose.

In the practical use of my improvement the belt under the influence of the wind will bear against and travel past the roller of my improvement and in that way the belt will be prevented from flapping in the wind and from leaving the pulley.

With the foregoing in mind, the invention in all of its details will be fully understood from the following description and claim when the same are read in connection with the drawings, acompanying and forming part of this specification, in which:—

Figure 1 is a view showing in perspective the preferred embodiment of my invention, the upright roller of the said embodiment being shown as properly engaging portions of a belt such as is employed between a threshing machine and the motor for actuating the machine.

Figure 2 is an enlarged fragmentary section showing the mounting of the lower end of the upright roller.

Figure 3 is an enlarged fragmentary plan view showing the upper or crown bearing member for the upright roller.

Similar numerals of reference designate corresponding parts in all of the views of the drawings.

The belt portions shown in Figure 1 are designated by 1 and the upright roller of my improvement is designated by 2, the said roller 2 being preferably composed of appropriate wood.

At its upper end the roller 2 is provided with a metallic journal 3 embedded in the end portion of the roller, and the said journal 3 at a point slightly above the roller 2 is disposed in a crown bearing member 4, equipped with apertured lugs 5; the said crown bearing member 4 being superposed upon a collar 6 above the roller 2 and about the journal 3, and the said bearing member 4 being, in turn, surmounted by a collar 7 secured by a nut 8 on the journal 3. Embedded in and preferably fixed to the lower end portion of the roller 2 is a journal 9 which extends through a chambered ferrule 10, preferably of metal, carried at the lower end of the roller 2 and provided with an oil duct 11. The journal 9 is arranged in a sleeve 11$^x$, and the said sleeve is flanged at 12 and is provided with a lower enlarged and threaded portion 13. A heavy metallic washer 14 is disposed above the flange 12 of the sleeve 11$^x$ in the chamber of the ferrule 10, and is interposed between the flange 12 and the opposed wall of the ferrule. It will also be noted that the heavy metallic washer 14 is arranged adjacent to the inner end of the lubricant duct 11 for the adequate supply of lubricant to the journal 9 and the washer 14. Below the sleeve enlargement 13, the journal 9 is equipped with a nut 15, and the said nut 15 is disposed in the chambered head 16 of a stake 17, which chambered head 16 is threaded on the sleeve enlargement 13 and effectively encloses the nut 15 on the lower end of the journal 9 so as to exclude dust and other foreign substance from the same.

Pivotally connected to the apertured lugs 5 of the crown bearing member 4 which lugs 5 are divergent as shown in Figure 3, are braces 18, the said braces 18 being respectively made up of a sleeve section 19 contiguous to the crown bearing member 4, and a rod-like section 20 telescopically arranged in the sleeve section 19 and terminating in a stake 21, and designed to be adjustably fixed to the sleeve section 19 through the medium of a set screw 22.

Manifestly when the stakes 17 and 21 are forced downwardly into the ground, the roller 2 will be strongly maintained in upright position, and this in such manner as to enable the roller 2 to withstand thrust of the belt 1 toward the right in Figure 1. It will also be apparent that my improvement is susceptible of being quickly and easily placed in position, and as readily removed, so that when occasion demands the improved belt guide and holder may be changed in position as varying conditions demand.

When the improvement is not in use, the said screws 22 may be loosened and the rod-like members 20 may be shoved into the sleeve sections 19 whereupon the said screws 22 may be tightened to secure the rod-like sections 20 in the sleeves, and the braces 18 may then be swung to positions alongside or approximately alongside the roller 2 so that with respect to length and to relative arrangement, the braces 18 will not be longer than the roller 2 and its appurtenances. From this it follows that when not in use the device will take up but little room in storage or shipment.

It will further be apparent from the foregoing that not only is my improvement simple and inexpensive in construction, but it is adapted, in general to withstand exposure to the weather and the wear imposed upon it.

I have entered into a detailed description of the construction constituting the preferred embodiment of my invention in order to impart a full, clear and exact understanding of the said embodiment, I do not desire, however, to be understood as limiting myself to the precise construction disclosed, my invention being defined by my appended claim within the scope of which modifications may be made without departure from my invention.

Having described my invention, what I claim and desire to secure by Letters Patent, is:—

In combination, an upright roller chambered at its lower end and having a lubricant duct leading from its periphery to the upper portion of said chamber, a journal carried by and pendent from said roller, a flanged sleeve surrounding said journal and having a flange at its upper end disposed in said chamber and also having a threaded enlargement at its lower end, a washer interposed between the flange of the sleeve and an opposed wall of the chamber, a nut secured on said journal and disposed below the threaded enlargement of the sleeve, and a stake having a chambered upper portion threaded on the enlargement of the sleeve and receiving and enclosing the nut and the lower end of the journal; the said upright roller being equipped at its upper end with means adapted to be embedded in the ground in a location spaced from the post.

In testimony whereof I affix my signature.

OTTO H. BOCHMAN.